Figure 1:
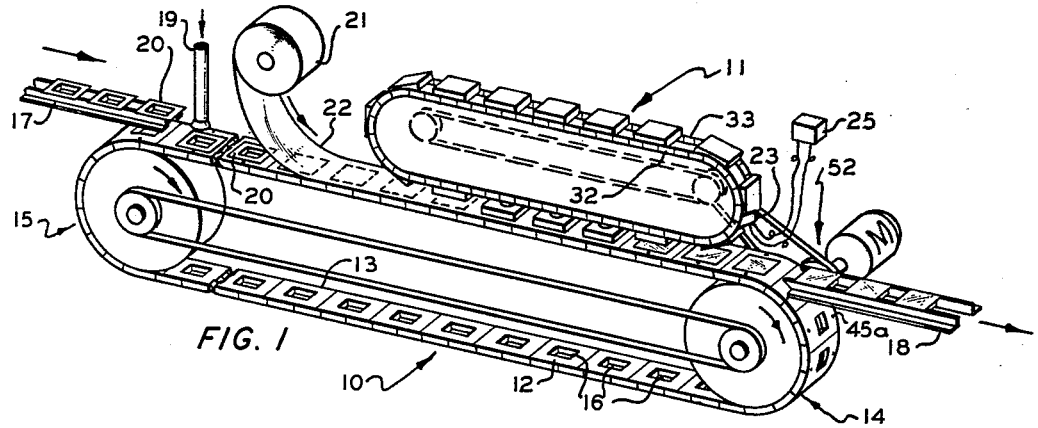

May 5, 1964

D. D. BUTTOLPH ETAL 3,131,521

HEAT SEALING THERMOPLASTIC PACKAGES

Filed March 23, 1961

2 Sheets-Sheet 1

INVENTORS
E.C. BEASON, JR.
D.D. BUTTOLPH

BY

*Hudson & Young*

ATTORNEYS

May 5, 1964     D. D. BUTTOLPH ETAL     3,131,521

HEAT SEALING THERMOPLASTIC PACKAGES

Filed March 23, 1961                                         2 Sheets-Sheet 2

INVENTORS
E.C. BEASON, JR.
D.D. BUTTOLPH

BY

ATTORNEYS

United States Patent Office 3,131,521
Patented May 5, 1964

3,131,521
HEAT SEALING THERMOPLASTIC PACKAGES
Doyle D. Buttolph and Elmer C. Beason, Jr., Bartlesville, Okla., assignors to Phillips Petroleum Company, a corporation of Delaware
Filed Mar. 23, 1961, Ser. No. 97,908
1 Claim. (Cl. 53—180)

This invention relates to heat sealing thermoplastic members. In one aspect this invention relates to a method for sealing thermoplastic packages utilizing a plurality of heat sources which move parallel with and synchronized with the packages to be sealed through the sealing zone and deviating the path of the heat source to cause contact with the packages. In another aspect this invention relates to an improved package sealing machine which conveys packages to be sealed along a predetermined path parallel with and synchronized with heat sealing elements which are moved into heat sealing engagement. In another aspect this invention relates to sealing units for sealing thermoplastic packages, the units comprising a heat sealing element, a carrier therefor and means to move the element relative to the carrier to produce heat sealing engagement.

Thermoplastic film and sheet materials are very useful for packaging many types of commodities, one well known example being food products. One of the advantages of the use of thermoplastic materials is that heat sealing can be utilized to fabricate and seal the packages, whether bags, boxes, wrapped coatings, etc. In producing satisfactory heat seals the proper combination of pressure, temperature and time is very important to make certain that the seal is made effectively and the package material is not damaged.

It is an object of this invention to provide effective heat sealing of thermoplastic packages.

Another object of this invention is to provide an improved method for heat sealing or bonding thermoplastic materials.

Another object of this invention is to provide novel heat sealing apparatus.

Another object of this invention is to provide an improved heat sealing unit.

Other aspects, objects and the several advantages of this invention are apparent upon study of this specification, the drawing and the appended claim.

According to our invention there is provided a method for sealing thermoplastic packages by passing the packages through a sealing zone, automatically passing separate heat sources parallel with and synchronized with the packages, and deviating the path of the heat sources to move the sources into sealing engagement to seal the packages. A resilient force as, for example, that applied by a spring, urges the sources in a direction to avoid contact with the packages while a sealing force is provided to move the sources into sealing engagement for a controlled period of time and at a controlled pressure.

Also, according to our invention there is provided an improved package sealing machine which includes means to convey packages along a predetermined path, means to convey sealing elements for the packages parallel with and synchronized with the packages, resilient means to apply a force to urge the sealing elements out of contact with the packages and means to overcome the resilient means to force the sealing elements into sealing engagement. Heating means are provided for the sealing elements and may take the form of a single radiant heater which supplies heat to all of the sealing elements in turn as they are moved by. However, an embodiment wherein a separate heater is provided in each sealing element and electrical power is supplied to these heaters by means of a bus bar and brush means has been found to be especially well suited for sealing thermoplastic packages.

Also, according to our invention the improved apparatus comprises a plurality of sealing units, each unit in turn comprising a sealing element and a carrier therefor and resilient means to apply a force to urge the sealing elements to the carriers out of contact with the packages and means to overcome the resilient means to force the sealing elements away from the carriers to deviate the path of the elements to force them into sealing engagement with the packages. In a preferred embodiment the resilient means comprises a spring which applies a force to urge the sealing elements and carriers together, while elongated cams are provided and these cooperate with cam followers associated with the sealing elements to overcome the spring to force the sealing elements into sealing engagement.

Also, according to our invention there is provided an improved sealing unit for a heat sealing machine, the unit comprising a heated sealing element, a carrier for the element, resilient means urging the element to the carrier, and a cam follower on the element to move the element against the force of the resilient means outwardly from the carrier. In one preferred embodiment a spring provides the resilient means while the cam follower comprises a roller rotatably mounted on the heat sealing element.

Figure 3:
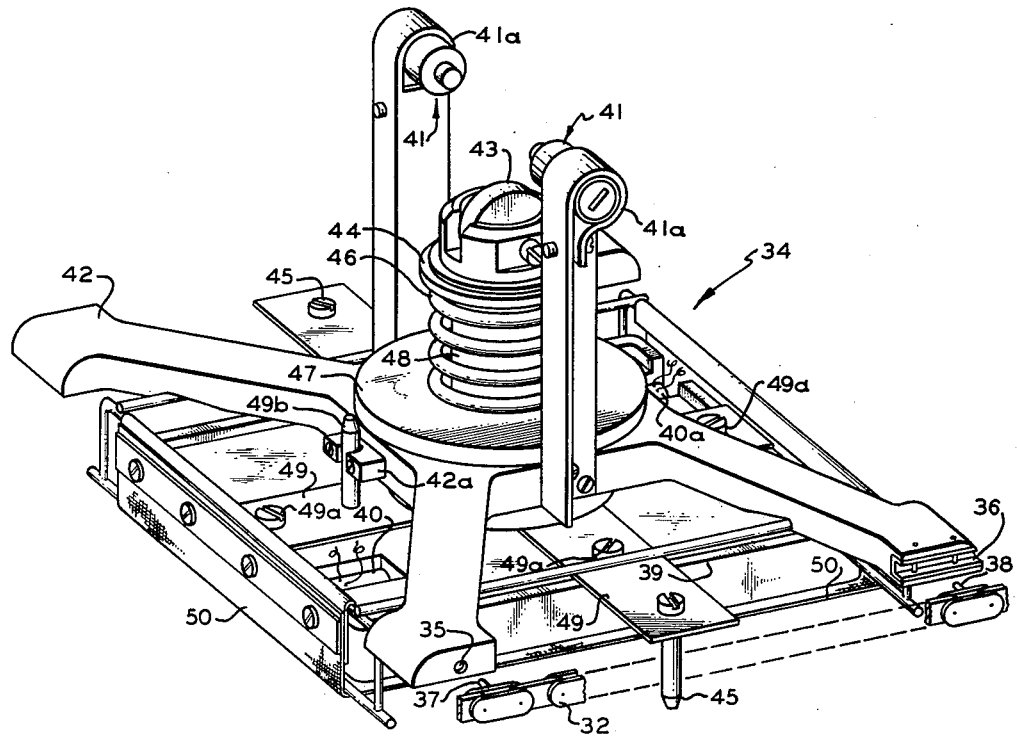
Figure 2:
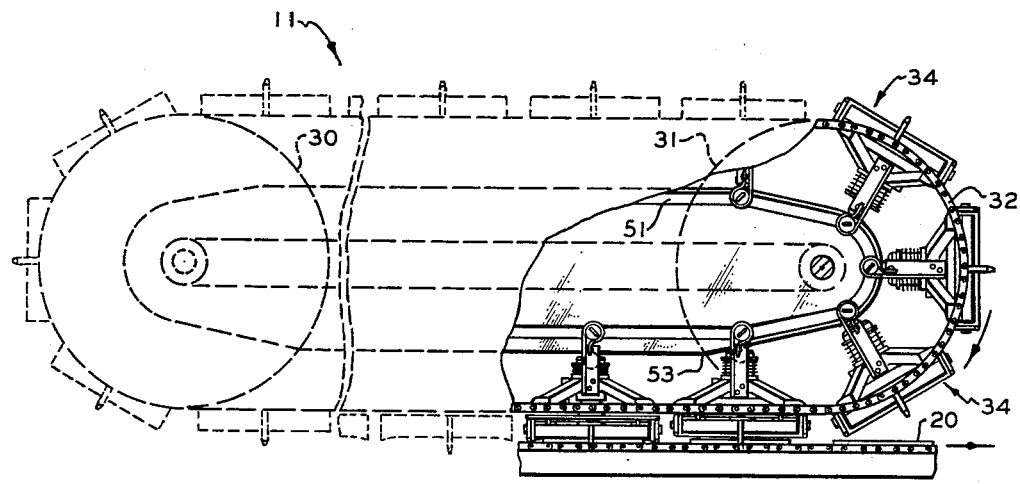
Figure 4:
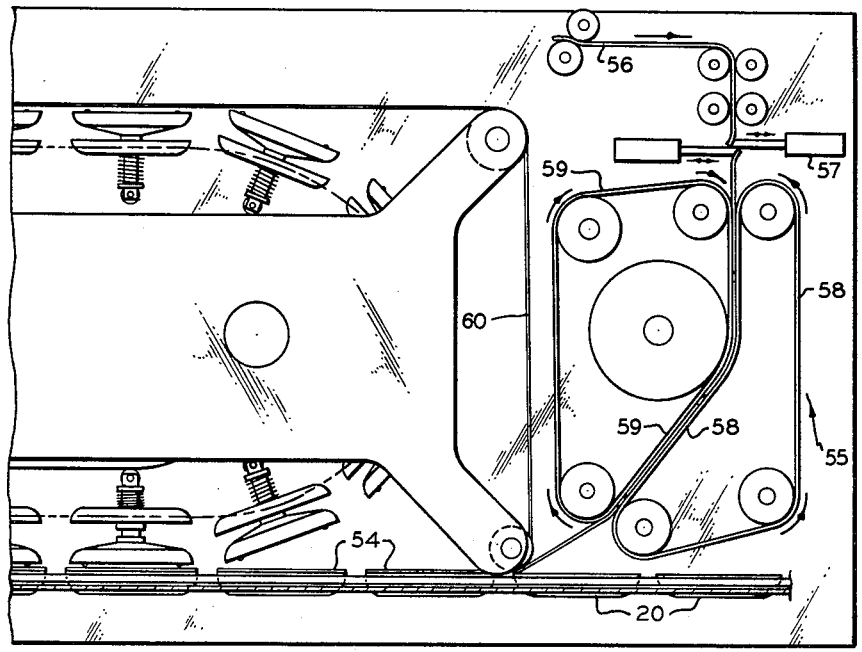

In the drawing:
FIGURE 1 is a schematic isometric view of a package sealing machine according to our invention.
FIGURE 2 is an elevation, partly in cross-section, of that portion of the apparatus which comprises the heat sealing units and the conveying mechanism therefor.
FIGURE 3 is an enlarged diametric view of a single heat sealing unit.
FIGURE 4 is a schematic elevation of one embodiment of the invention.

As illustrated in FIGURE 1, a complete package sealing machine comprises a package conveying section 10 and a sealing element conveying section 11. Section 10 comprises chains 12 and 13, a pair of driving sprockets 14 and a second pair of sprockets 15. Supported between chains 12 and 13 are a plurality of package receptacles 16. A package delivery conveyor 17 and a package removal conveyor 18 are provided as shown, conveyor 17 delivering empty packages to the machine and conveyor 18 removing filled and sealed packages from the machine for further processing. A package filling conduit 19 feeds the desired commodity into the empty packages 20 and a film feeding roll 21 feeds a thermoplastic cover film 22. A suitable cutter is provided to separate the film into individual covers for the packages but is not shown to simplify the illustration.

Section 11 is illustrated in more detail in FIGURE 2 and comprises pairs of sprockets 30 and 31 and driving chains 32 and 33 (see FIG. 1). A plurality of sealing units 34 (see FIG. 3) are attached between chains 32 and 33 with pivotal connections 35 and sliding connections 36. Pins 37 and 38 engage pivotal connections 35 and sliding connections 36, respectively.

Sealing units 34 further comprise a movable sealing element 39 which is provided with electrical heating elements 40 and 40a, brush assemblies 41 held in place by clamps 41a, a cam follower roller 43, a shoulder 44 and guide pins 45. Suitable electrical connections, not shown, are made between brush assemblies 41 and heating elements 40 and 40a. Shoulder 44 is formed on shaft 48, and a pair of leaf springs 49 are attached to shaft 48 at the lower end thereof and to element 39 by screws 49a. Frame 42 encircles shaft 48 but is not attached thereto. A guide pin 49b is attached to one of the leaf springs 49 and cooperates with guide bracket 42a attached to frame 42.

Springs 49 provide a resilient connection between element 39 and shaft 43 and thus permit some variation in the thickness of the packages being sealed and compensate for minor misalignment of the carrying or sealing elements. A spring 46 is compressed between shoulder 44 and shoulder 47 to urge movable sealing element 39 to its retracted position. A glass cloth 50 impregnated with polytetrafluoroethylene is attached to sealing unit 34 and extends over the sealing face of the movable sealing element 39 spaced from the sealing face as shown. As illustrated in FIGURE 2, sealing element conveyor section 11 also comprises bus bars 51 and elongated cam 53. A driving means 52 (see FIGURE 1) drives both package conveying section 10 and sealing element conveying section 11 through suitable chain drive assemblies to maintain the sections synchronized. Holes 45a are provided in package receptacles 16 to engage pins 45 to counteract any slight amount of lost motion in the mechanism and perfectly align sealing unit 34 with package receptacle 16.

In operation, thermoplastic packages 20 are transported by conveyor 17 and fed into package receptacles 16 of package conveying section 10. As packages 20 pass by package filling conduit 19 they receive a predetermined amount of the commodity to be packaged. The filled packages then proceed along conveying section 10 and film 22 is fed over the top of these packages. As each package, conveyed in a package receptacle 16, travels under section 11 a corresponding sealing unit 34 is positioned directly over the moving package. As the units proceed further, the roller 43 of movable sealing element 39 engages elongated cam 53 to move element 39 downward into engagement with the cover of the corresponding package. Guide pins 45 engage holes 45a for perfect alignment and the face of element 39 presses, through cloth 50, against the package cover thus providing the necessary heat and pressure for effecting the desired seal. Cam 53 maintains element 39 in contact with the package assembly for a period of time sufficient to obtain a satisfactory seal with the film thickness, sealing temperature and speed of travel of the machine.

It will be seen that brush assemblies 41, through contact with bus bars 51 provide electrical power from a suitable source of electrical energy, not shown, to heating elements 40 and 40a. After the desired contact time, determined by the length of cam 53, sealing element 39 is retracted by spring 46, acting against shoulders 44 and 47. The sealing unit 34 proceeds on around the conveying section 11 while the now sealed package travels on toward the end of conveying section 10. Film 22 may be cut into individual cover pieces prior to, coincident with, or following the sealing operation. The sealed packages then proceed from section 10 on to package removal conveyor 18 for further handling which may include, for example, trimming, labeling, freezing, retorting, storage, transportation, etc.

Proper seal conditions are provided by controlling the length of contact path, the travel and temperature of the sealing element 39. The temperature of the sealing elements can be controlled through manipulation of temperature control means 23 and more specifically by adjusting the set point of controller 25. The length of time of the contact of sealing element 39 with the package to be sealed can be adjusted both by the speed of the conveying sections and the length of elongated cam 53. The contact pressure also can be modified by adjusting cam 53 by changing the height thereof. Where desirable, suitable heating means can be provided for the packages and/or the cover film.

In another embodiment of my invention, for use especially in those instances in which separate pre-cut lids are fed to the package, the cloths 50 can be eliminated and an endless belt arranged to run between the sealing elements and the units being sealed, and to hold the lids in place. This is illustrated schematically in FIGURE 4 in which pre-cut lids 54 are fed from lid cutting and feeding unit 55. The lids are cut from a continuous film 56 by a cutter 57. The operation of this cutter is coordinated with the speed of travel of the film to cut the desired lengths and is positioned so that one end of each cut length is held at all times. From cutter 57 the cut film is fed between belts 58 and 59 and proceeds from the outlet of unit 55 between belt 60 and packages 20. The lids are controlled from the time they are cut until after the seal has been made and the sealing unit withdrawn.

Although the apparatus as illustrated comprises a conveyor moving in a vertical plane for transporting sealing units 34 a conveyor moving in a horizontal plane also can be used in which case the sealing face is oriented at right angles to the plane of the conveyor. In the apparatus shown in the drawing and described above, a preferred embodiment of the invention, the path of the sealing element is deviated to cause sealing engagement. However, it is also possible to deviate the path of the package being sealed to cause sealing engagement with the sealing element and control the deviation and pressure of the sealing period.

Our invention has particular utility when applied to sealing thermoplastic containers by applying thermoplastic covers and sealing the covers to the containers, but it also is applicable to sealing other types of packages, for example, bags which are sealed by joining the two edges of an open end, and wrapped objects which are sealed by joining portions of the wrapper to itself.

Although this invention is especially adapted to the use of sealing elements having a glass cloth impregnated with polytetrafluoroethylene extending over the sealing face, it also encompasses the use of other materials for the covering cloth such as, for example, a polyethylene terephthalate belt, etc., and the use of uncovered metal sealing faces where applicable.

Reasonable variation and modification are possible within the scope of the foregoing disclosure, the drawing and the appended claim, in which are set forth method of and apparatus for heat sealing thermoplastic packages by conveying the packages parallel with and synchronized with heat sealing elements and applying a force to cause heat sealing engagement between the packages and the elements, and a novel sealing unit comprising a sealing element, a carrier and means to move the element relative to the carrier.

We claim:

A sealing unit for sealing thermoplastic packages, comprising a sealing element, said element comprising a sealing face and a support member, a pair of crossed, flat springs attached to said support member at a central location and to said sealing face at peripheral locations, whereby said sealing face is readily adaptable to variations in height of the upper surface of the package being sealed, means for heating said face, a carrier for said element, said element being movable in a straight line with respect to said carrier, resilient means urging said element to said carrier, and a cam follower on said element to move said element, against the force of said resilient means, outwardly from said carrier.

References Cited in the file of this patent

UNITED STATES PATENTS

| | | |
|---|---|---|
| 2,738,631 | Jarund | Mar. 20, 1956 |
| 2,877,121 | Anderson et al. | Mar. 10, 1959 |
| 2,896,387 | Brock | July 28, 1959 |
| 2,916,864 | Meissner | Dec. 15, 1959 |
| 3,001,348 | Rado | Sept. 26, 1961 |
| 3,018,594 | Phillips | Jan. 30, 1962 |